United States Patent [19]
Paakkinen et al.

[11] 4,134,562
[45] Jan. 16, 1979

[54] MOUNTING BASE OF A DISK REFINER

[75] Inventors: Ilmari Paakkinen, Nojanmaa; Seppo Häkkinen; Jouni Matula, both of Savonlinna, all of Finland

[73] Assignee: Enso-Gutzeit Osakeyhtio, Helsinki, Finland

[21] Appl. No.: 787,439

[22] Filed: Apr. 14, 1977

[30] Foreign Application Priority Data

Apr. 15, 1976 [FI] Finland .................................. 761049

[51] Int. Cl.² .......................... H02B 5/00; F04B 35/04; E02D 27/44
[52] U.S. Cl. ............................................ 639; 248/679
[58] Field of Search ....................... 248/19, 20, 21, 22, 248/13, 346

[56] References Cited

U.S. PATENT DOCUMENTS

| | | | |
|---|---|---|---|
| 1,061,672 | 5/1913 | Hodkinson | 248/19 UX |
| 2,568,783 | 9/1951 | Woodruff | 248/19 X |
| 2,802,632 | 8/1957 | Byers | 248/19 |
| 3,066,449 | 12/1962 | Cramer | 248/19 X |
| 3,330,514 | 7/1967 | Williams | 248/20 |
| 3,369,783 | 2/1968 | Keating | 248/19 |
| 3,800,636 | 4/1974 | Zagar | 248/19 X |

*Primary Examiner*—J. Franklin Foss
*Attorney, Agent, or Firm*—Lewis H. Eslinger

[57] ABSTRACT

For a disk refiner which includes a frame with a refiner housing, a driving shaft, and a driving motor, a mounting base in the form of an integrated block made of a material absorbent to vibrations of the disk refiner, said block having at one end, symmetrically in relation to the longitudinal central line of the base, support surfaces for the driving motor and, at its other end, two front supports for the refiner frame and, at a distance from said front supports, two rear supports for the refiner frame, said front and rear supports being situated pairwise symmetrically in relation to the shaft of the refiner, essentially in a plane extending along the longitudinal central line of the shaft, and at the ends of column-like projections extending upwards from a plane defined by said support surfaces.

3 Claims, 4 Drawing Figures

MOUNTING BASE OF A DISK REFINER

BACKGROUND OF THE INVENTION

1. Field of the Invention

The present invention relates to disk refiners and more particularly to a mounting base for a disk refiner that includes a frame with a refiner housing therein, a driving shaft and a driving motor, said base being in the form of an integrated block of a material adsorbent to vibrations of the disk refiner.

Description of the Prior Art

In existing art the frame of the refiner rests on a base having fixing planes in register with the legs provided on the frame. As a consequence, the frame will be massive and, consisting of metal (most often of steel or cast iron), expensive. In this case the moving parts of the refiner, which give rise to vibrations, are far away from the base, whereby the vibration amplitude increases unless the frame is made exceedingly rigid and massive. A rigid and massive frame again causes in connection with varying temperatures and manufacturing accuracies, deformations in other parts of the refiner as well.

A disk refiner is usually affixed to the floor of the workshop so that the disk refiner proper stands on the legs provided on its frame, upon a base of its own, and the motor driving the refiner rests on a base of its own. Herefrom certain detriments arise, however.

Among the detriments is the fact that when potentially the disk refiner is moved to another point in the shop hall e.g. in connection with expansions, it is once again necessary to concrete upon the floor a new mounting base for the refiner, and this is expensive. Furthermore, when separate mounting bases are being constructed for the refiner and for the motor in a new plant, their dimensioning is comparatively accurate work, all measurement tolerances being reflected in the operation of the refiner and motor and of the coupling mounted therebetween.

From the viewpoint of the vibrations caused by the refiner it is difficult or outright impossible to insulate the base from the building surrounding it; this is primarily due to the fact that it is necessary under the refiner and motor bases to use columns or pillars, since both units impose a fairly high load per unit floor area.

SUMMARY OF THE INVENTION

The present invention provides for a disk refiner a base of the character once described, which comprises support surfaces for a motor driving the disk refiner, said support surfaces being situated at one end of the block and symmetrically in relation to the longitudinal central line of the base, two front supports for the refiner frame, said front supports being situated at the other end of said block and symmetrically in relation to the shaft of the disk refiner, two rear supports for the refiner frame, said rear supports being situated at a distance from the front supports and symmetrically in relatiion to the shaft of the refiner, said front and rear supports being positioned essentially in a plane extending along the longitudinal central line of the refiner shaft and at the ends of column-like projections extending upwards from a plane defined by said support surfaces.

Thus according to the invention the mounting base is made such that the refiner is affixed by three or more supporting surfaces and that from the base column-like projections extend towards the refiner and on the ends of which the said supporting surfaces are found. Whereby no legs are needed on the frame of the refiner: the refiner rests on the supporting surfaces in such manner that the frame merely has fixing points resting against the supporting surfaces and which points may advantageously be disposed close to the plane passing through the centre-line of the refiner. The following advantages are hereby gained.

There is no need to make the frame any larger than is implied by the operation of the refiner, that is by its bearing arrangement and the location of the refining chamber.

It is then possible to construct the frame as a symmetrical structure, whereby the thermal expansion causes no deformations. When the refiner is affixed to a massive mounting base close to the plane passing through the centre-line of the refiner, the vibrations of the refiner can be minimized. The smaller size of the frame implies cost economy in addition.

A favourable embodiment is furthermore one in which the motor and the refiner are mounted on one and the same base.

The invention is in fact particularly intended for use in connection with the disk refiner disclosed in the U.S. Pat. application Ser. No. 787,436, filed simultaneously with this application and hereby incorporated by reference.

The object of the present invention is accordingly to provide a base of such geometrical shape that highest possible rigidity is obtained in all and any refining situations imposed on the refiner, which situations may involve asymmetric conditions and thus give rise to bending. It is a further object to eliminate as far as possible the drawbacks mentioned above. The mounting base according to the invention, brings along the following further advantages:

It is possible to machine the base, already by action of the supplier of the refiner or of the mechanical workshop, to closer dimensions than can be accomplished when the base is made, as in previous art, by concreting on the floor in the shop hall. Furthermore there is no necessity of subsequent amendments of the base, whereby the delivery time of the refiner is curtailed because the installation may take place immediately.

It is further noted that the foundation work required for the refiner is simplified since all that is required is a floor of sufficient bearing capacity under the base, and which usually is the floor of the shop hall. One of the advantages compared with separate bases of prior art is that the refiner frame need not be braced by separate metal legs against the base, as the base consists of one and the same material, concrete in the first place. This involves considerable savings. The other materials mentioned in the claims may also be contemplated.

BRIEF DESCRIPTION OF THE DRAWINGS

The invention is described below by reference to the drawings, wherein FIG. 1 present an elevational view of a disk refiner and of the motor driving same, placed on a mounting base according to the invention, while

DESCRIPTION OF THE PREFERRED EMBODIMENT

Figure 1:
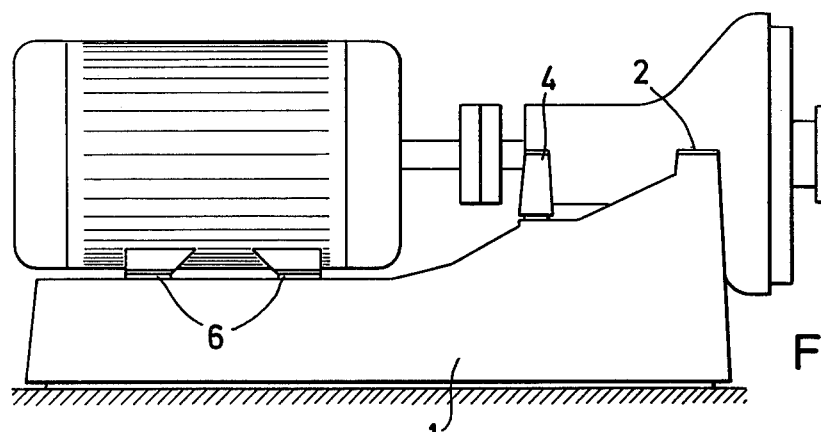
Figure 2:
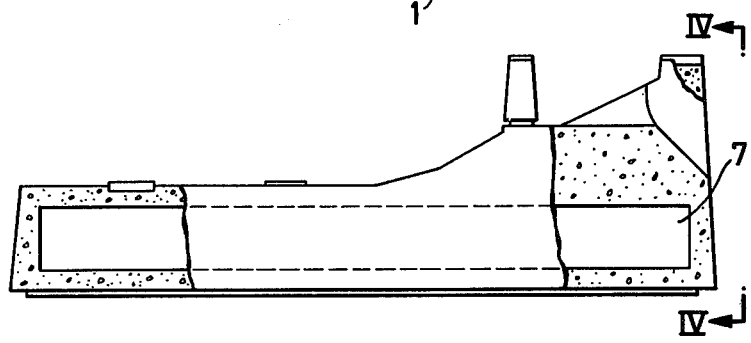
FIG. 2 shows in partly sectioned elevational view the mounting base of the invention alone.
Figure 3:
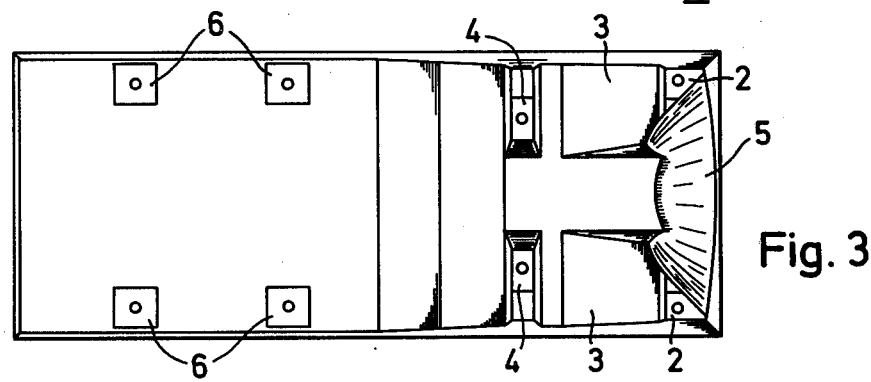
FIG. 3 shows a top view of the mounting base.
Figure 4:
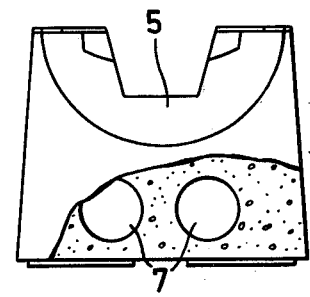
FIG. 4 shows the mounting base viewed from one end and partly sectioned along the line IV—IV in FIG. 2.

As can be seen from FIG. 1, the mounting base 1 has such length that it also extends to be below the motor driving the disk refiner. The mounting base is preferably made of concrete, which is a comparatively inexpensive material compared with other materials used to this purpose, metals in the first place, and whereby the quantity of metal used up by the refiner mechanism is reduced. From the use of concrete the advantage is derived that the mounting base can be made massive enough to damp out the vibrations arising from the running of the refiner. Owing to its massivity the mounting base need not be bolted or grouted to the floor: it may simply be placed upon a rubber mat laid over the floor.

The shape of the mounting base also has a very high significance. The part under the motor is naturally horizontal, and its height has been dimensioned in view of the shaft height of standard motors. From about half of the base length towards the refiner the height of to mounting base begins to increase so that the front supports 2 of the refining chamber close to the refining plates of the refiner are as rigidly tied to the mounting base 1 as possible. This has been accomplished by means of slanting surfaces 3 extending on either side of the refining chamber up to the front supports 2 and leaving between themselves a space 5 accommodating the cone part of the refining chamber. The rear supports 4 of the refining chamber, again, are elastic in the longitudinal direction. This elasticity has been accomplished by dimensioning the rear support so that the requisite deflection can be produced. This because the deformations of the refiner all occur in the axial direction of the refiner.

The mounting base has furthermore four supporting surfaces 6 for the electric motor. The width of the mounting base is approximately equal to the width of the electromotor and of the refining chamber. Inside the mounting base furthermore cavities 7 have been provided, which one hand serve to reduce the mass of the mounting base and on the other hand to equalize the temperature differences resulting from the operation of the refiner, since with the latter in mind air may be conducted into the said hollow spaces.

What is claimed is:

1. A mounting base for a disk refiner that includes a frame, a refiner housing, a longitudinally extending centrally located shaft and a driving motor; said mounting base comprising an integrated block of concrete absorbent to vibrations of the disk refiner; said block having:
   (i) support surfaces formed thereon for supporting a motor driving the disk refiner, said support surfaces being situated at one end of the block and being located symmetrically in relation to the longitudinal central line of the base,
   (ii) two front supports formed thereon for the refiner frame and housing, said supports being situated at the other end of said block and being located symmetrically in relation to the shaft of the disk refiner, and
   (iii) two rear supports for the refiner frame, said rear supports being situated at a distance from the front supports and being located symmetrically in relation to the shaft of the refiner, said front and rear supports each being formed as column-like projections having free support ends positioned essentially in a plane extending along the longitudinal central line of the refiner shaft and being located above the plane defined by said support surfaces; said front supports being positioned to engage the refiner housing of the disk refiner and having a recess formed between them corresponding to the shape of the refiner housing; said front supports being reinforced in the longitudinal direction of the base by providing at the lower parts of the projections wedge parts with inclined surfaces.

2. A base according to claim 1, wherein the projections serving as rear supports for the refiner frame are resilient in the longitudinal direction of the base.

3. A base according to claim 1, wherein the base is made of a concrete block having in its lower part cavities into which a flowing medium can be conducted in order to equalize temperature differences.

* * * * *